United States Patent
Carlson, Jr. et al.

[11] Patent Number: 5,942,729
[45] Date of Patent: *Aug. 24, 1999

[54] DOUBLE HINGED RACEWAY

[75] Inventors: Robert C. Carlson, Jr., Torrington; Mark Viklund, Milford, both of Conn.

[73] Assignee: The Siemon Company, Watertown, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/905,429

[22] Filed: Aug. 4, 1997

[51] Int. Cl.⁶ ...................................................... H01B 3/14
[52] U.S. Cl. .............................................. 174/68.1; 174/66
[58] Field of Search ............................... 174/101, 95, 96, 174/97, 68.3, 67; 16/267, 374; 220/340, 341

[56] References Cited

U.S. PATENT DOCUMENTS

| | | | |
|---|---|---|---|
| 2,263,946 | 11/1941 | Fletcher | 16/267 |
| 2,302,661 | 11/1942 | Benson | 16/267 |
| 3,425,587 | 2/1969 | Duross, Jr. | 220/326 |
| 3,727,644 | 4/1973 | Kagan | 138/755 |
| 3,927,698 | 12/1975 | Johannsen | 138/162 |
| 4,423,284 | 12/1983 | Kaplan | 174/101 |
| 4,560,320 | 12/1985 | Baus | 415/118 |
| 4,627,469 | 12/1986 | Buard | 138/92 |
| 4,640,314 | 2/1987 | Mock | 138/162 |
| 4,720,768 | 1/1988 | Schindele | 361/622 |
| 4,942,271 | 7/1990 | Corsi et al. | 174/101 |
| 5,089,667 | 2/1992 | Goussin | 174/101 |

FOREIGN PATENT DOCUMENTS

| | | | |
|---|---|---|---|
| 582361 | 9/1959 | Canada. | |
| 2 425 518 | 12/1979 | France. | |
| 3335884 | 4/1985 | Germany | 174/101 |
| 609 177 | 2/1979 | Switzerland. | |
| 1021871 | 3/1966 | United Kingdom | 174/101 |

*Primary Examiner*—Nestor Ramirez
*Assistant Examiner*—Joseph Waks
*Attorney, Agent, or Firm*—Cantor Colburn LLP

[57] ABSTRACT

An enclosed channel for routing of telecommunications or power cables. A double hinged raceway is provided that includes an extruded base and cover in which the cover is hingedly and removably connected to both sides of the base to allow easy access to the cables. The extruded base and cover snap together to provide an enclosed channel or cable pathway for routing of telecommunications or power cables. The symmetrical shape of the extruded base and cover allow the cover to be hinged open from either side of the base while providing a stopping point for the hinged cover in the formation of a trough for retaining cables prior to snapping the cover in the closed position.

5 Claims, 8 Drawing Sheets

DOUBLE HINGED RACEWAY

BACKGROUND OF THE INVENTION

1. Field of the Invention

This invention relates to raceways which provide an enclosed channel for routing of telecommunications (voice or data) or power cables. More specifically, this invention relates to a double hinged raceway that includes an extruded base and cover in which the cover is hingedly and removably connected to both sides of the base to allow easy access to the cables. The extruded base and cover snap together to provide an enclosed channel or cable pathway for routing of telecommunications or power cables.

2. Prior Art

Typically, in an office environment, especially those with stone or brick walls, telecommunications or power cables are installed and routed through an extruded surface mount raceway/trunking device. Prior art systems are typically constructed of extruded metal or plastic. Plastic is the more popular choice and plastic raceways are offered in a one-piece or two-piece straight extrusion that is mounted along office walls to route cable from floors, ceilings or through walls from adjacent rooms to work area outlets. Several two piece prior art raceway systems (see Hubbell, U.S. Pat. No. 4,942,271; U.S. Pat. Nos. 3,425,587 and 3,737,644, and Canadian Patent 582,361) offer the ability to hinge the cover open from the base to install the cabling without snapping the cover off the base. However, the cover on these prior art trunking devices only hinge from one side of the base. This is a significant drawback as it forces the installer to mount the raceway in a certain direction on the wall. In certain applications of these prior art devices, where there is a need for the hinged connection to vary, such as in confined and crowded areas where building materials or complex geometric configurations restrict access to the raceway, the one sided hinged connection is ineffective and requires the installer to remove the cover altogether for installation. Removal of the cover makes installation of the cables more difficult and time consuming. This in turn increases the cost of the installation by necessitating a greater expenditure of time. Thus, the industry is in need of a trunking device which addresses these problems.

SUMMARY OF THE INVENTION

The above-discussed and other drawbacks and deficiencies of the prior art are overcome or alleviated by the present invention. In accordance with the present invention, a double hinged raceway is disclosed which comprises a channel receptive to cable having a base and a cover which hinges from either side of the base. The base has spaced apart releasable first hinge portions which mate with corresponding spaced apart releasable second hinge portions on the cover. The first hinge portions cooperate with corresponding second hinge portions to provide a hinge action at each of the cooperating first and second hinge portions. The first hinge portions further cooperate with the second hinge portions to provide defeatable attachment at each of the cooperating first and second hinge portions so that the cover may be hinged at either cooperating first and second hinge portions.

The cover and base define a channel receptive to cable and are made of an extruded plastic material. The first hinge portions include a first hinge release mechanism in the form of a snap lock which mates with a second hinge release mechanism, also a snap lock, on the second hinge portion. The snap lock mechanisms include an opening in the first hinge portions defined by two extensions which have opposed contoured faces. The second hinge portions include a projecting portion in the form of a leg having a distal end. The distal end includes a curved section extending to a planar section which is retained in the opening by the contour of the faces. The projecting portion and the distal end cooperate with the faces of the extensions to provide the hinge action and defeatable attachment. The planar section contacts a nub on an inner face during the hinge action to form a hinge stop. The cover includes outwardly and downwardly extending members in the form of fingers which contact the base to provide a second hinge stop.

The extruded base and cover surface mount raceway is easy to install and allows the user more flexibility when installing a raceway system as the installer need not be concerned with the orientation of the raceway. Providing such a device allows the installer the opportunity to snap the cover onto the base and hinge it open from either side of the base and not be concerned with the orientation of the extruded base when attaching it to the wall. Another objective is to provide an aesthetically pleasing system which allows the installer the opportunity to snap the cover onto the base and hinge it open from either side of the base. Also, the cover will remain attached to the base when opened to form a trough to facilitate easy loading of cables. It will be apparent to those skilled in the art that variations in the geometries of the base and cover and the cooperating first and second hinge portions are within the scope of the present invention. The orientation of the hinge portions may be substituted to accomplish the same snap lock action at each cooperating first and second hinge portions.

The above description and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
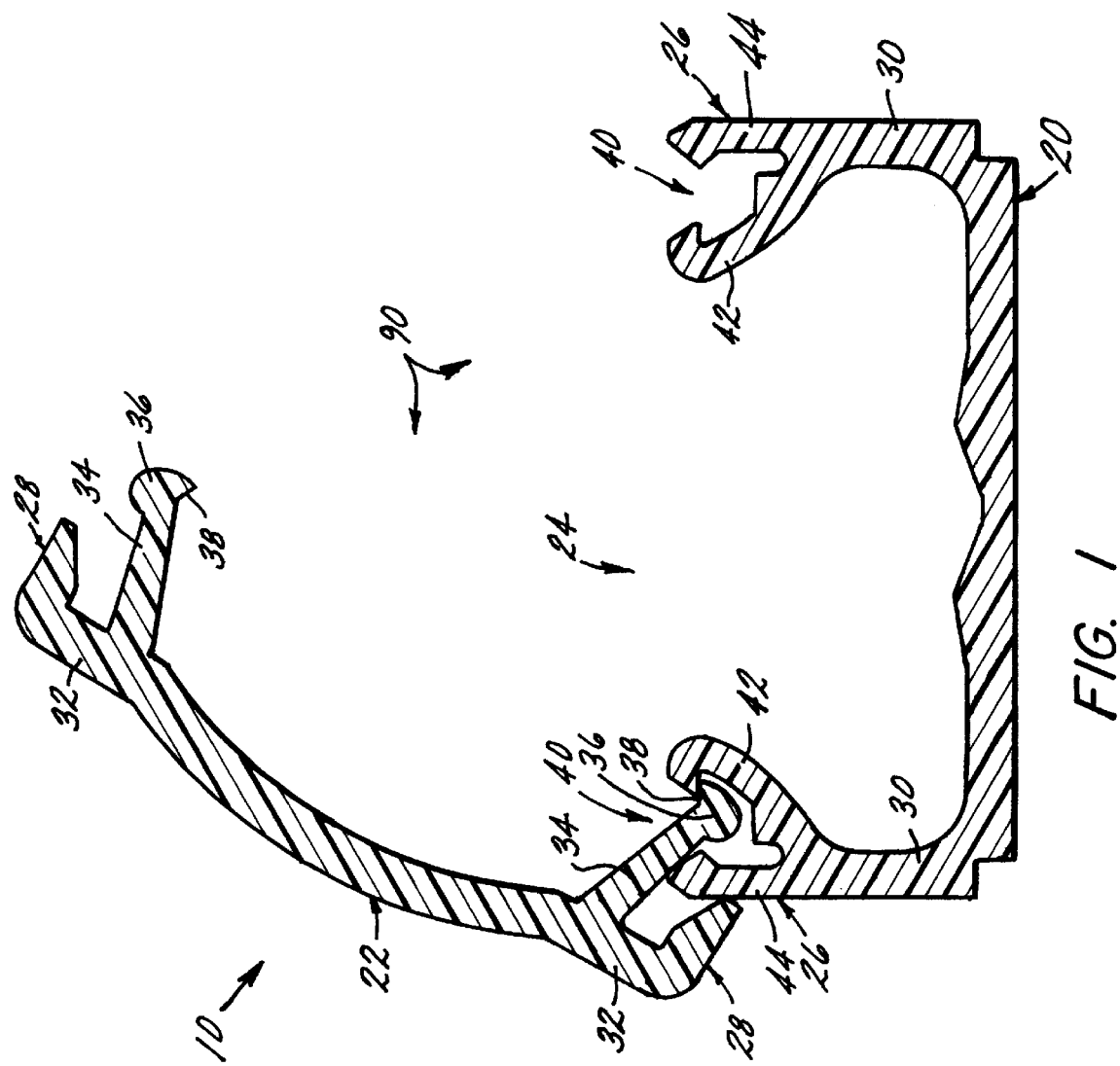
FIG. 1 is a transverse cross-sectional view of the cover and base with the cover snapped onto the left side of the base and hinged open, in accordance with the present invention.
Figure 4:
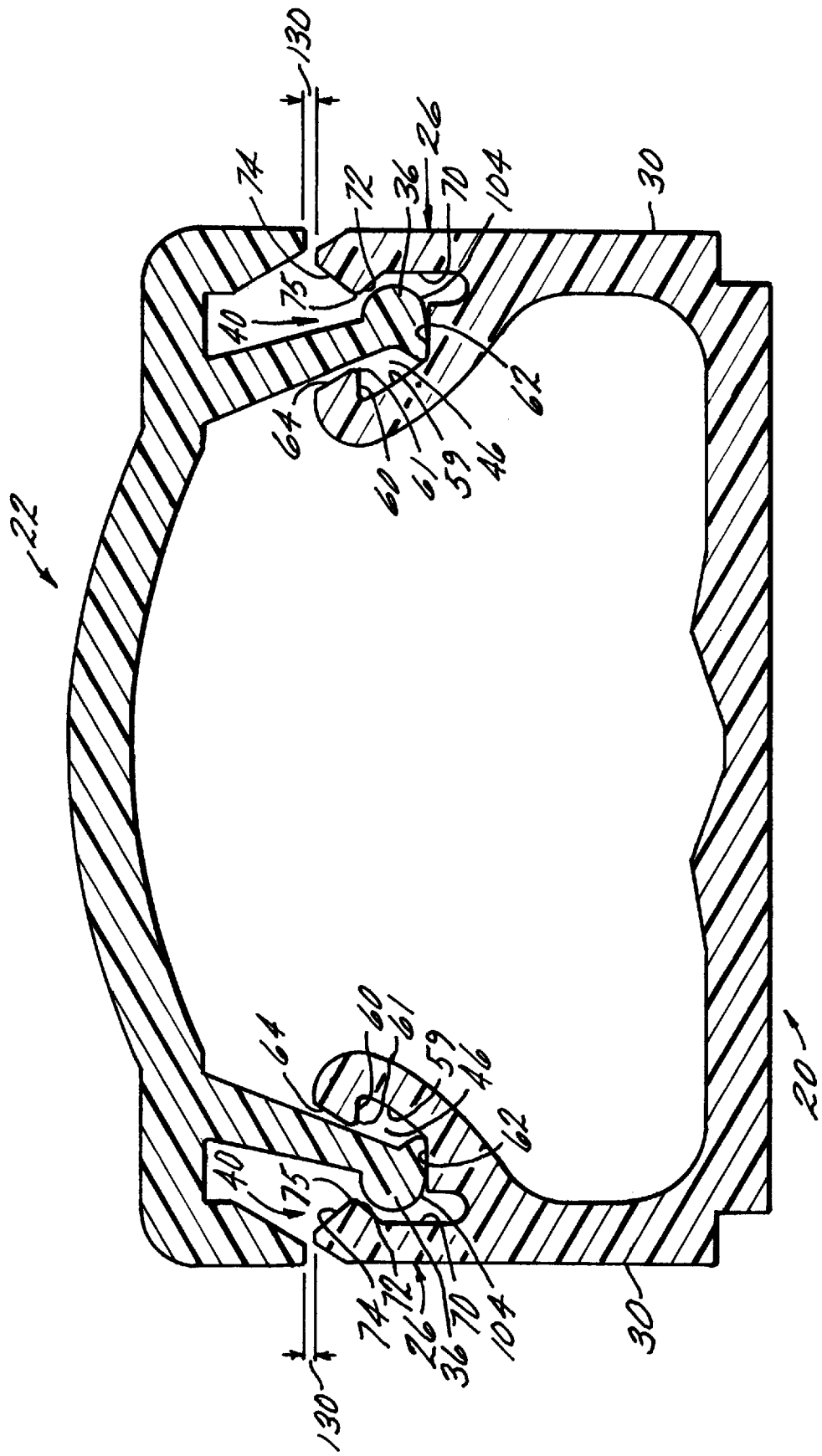
FIG. 4 is a transverse cross-sectional view of the cover and base of FIG. 1 in a closed position.
Figure 10:
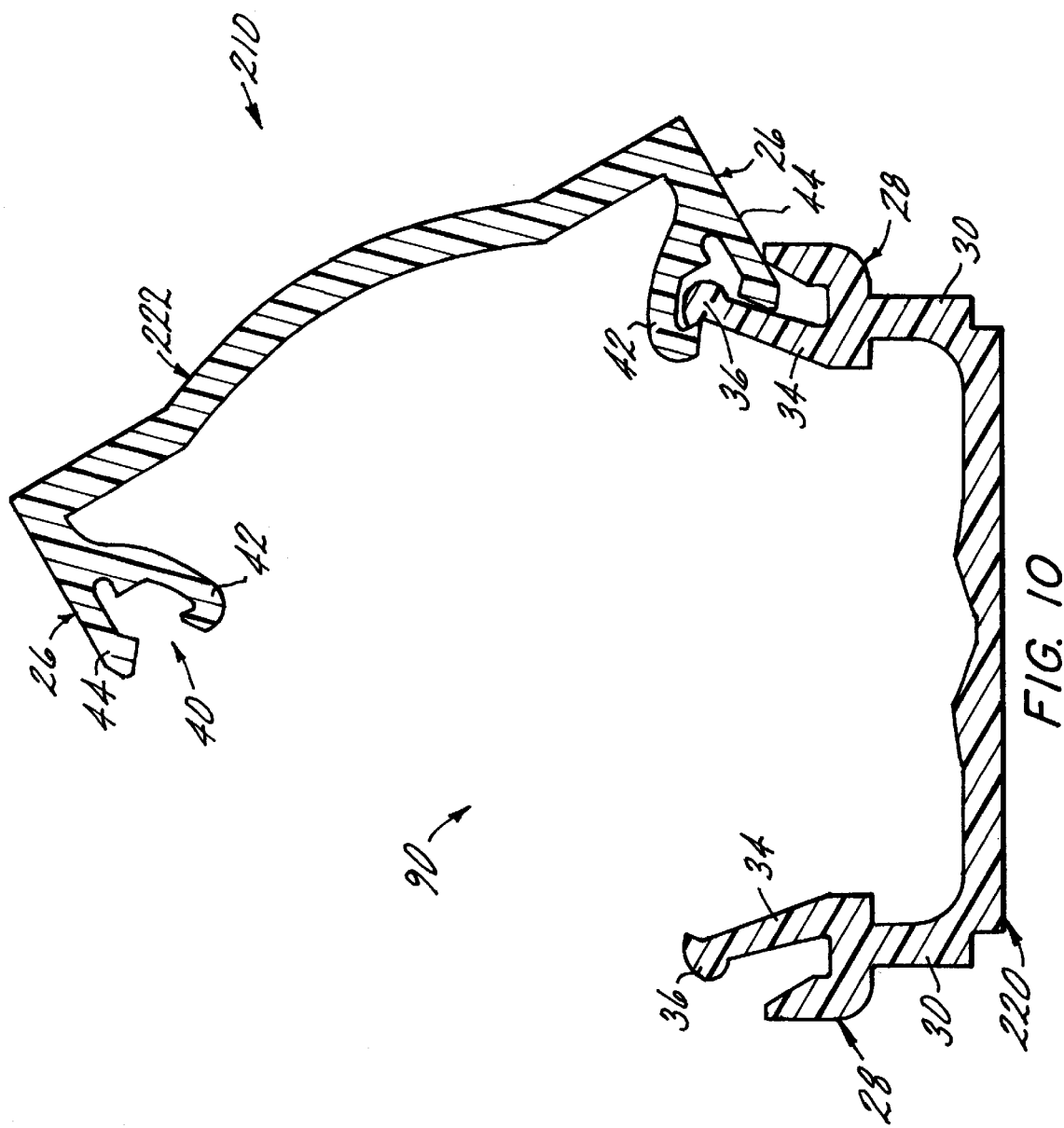
FIG. 10 is a transverse cross-sectional view of another embodiment of a cover and base with the cover snapped onto the right side of the base and hinged open, in accordance with the present invention.

Referring now to FIG. 1, a double hinged raceway of the preferred embodiment of the invention is generally shown at 10. Raceway 10 comprises a resilient plastic extruded base 20 and a resilient plastic extruded cover 22 which form an enclosed channel 24 and are designed to be used with a multitude of fittings to comprise a surface mount perimeter raceway/trunking device to receive telecommunications and power cables. Base 20 has spaced apart releasable first hinge portions 26. Cover 22 has corresponding spaced apart second hinge portions 28. First hinge portions 26 on base 20 mate with their corresponding second hinge portions 28 on cover 22 to provide a hinge action at each of the corresponding first and second hinge portions. First hinge portions 26 and second hinge portions 28 additionally provide a defeatable attachment with respect to each other to allow cover 22 to open from either side 30 of base 20. Cover 22 includes relatively flat horizontal sections 32 with projecting portions in the form of legs 34 depending downward therefrom. Legs 34 have distal ends in the form of curved sections 36. Each curved section 36 extends to a planar section 38. Curved sections 36 snap into respective openings 40 on base 20. Each side 30 of base 20 includes opposed extensions in the form of arms 42 and posts 44 which depend upwardly. Arms 42 are inward of posts 44. Arms 42 and posts 44 form retaining areas 46, best seen in FIG. 2, which receive curved sections 36 of legs 34 for snapping cover 22 closed and allowing it to pivot open from a closed position from either side 30. An open position of base 20 and cover 22 is shown in FIG. 1 and a closed position is shown in FIG. 4. The shape of arms 22 and posts 44 retains respective curved sections 36 of legs 34 throughout their respective motion and prevents cover 22 from being detached from base 20 during closure. It will be appreciated that respective hinge portions on base 20 and cover 22 may be exchanged to accomplish the same hinge action and defeatable attachment to allow cover 22 to hinge open from either side 30 of base 20. Referring to FIG. 10, an alternate embodiment of the present invention is generally shown at 210 with a base 220 having second hinge portions 28 and a cover 222 having first hinge portions 26.

Figure 2:
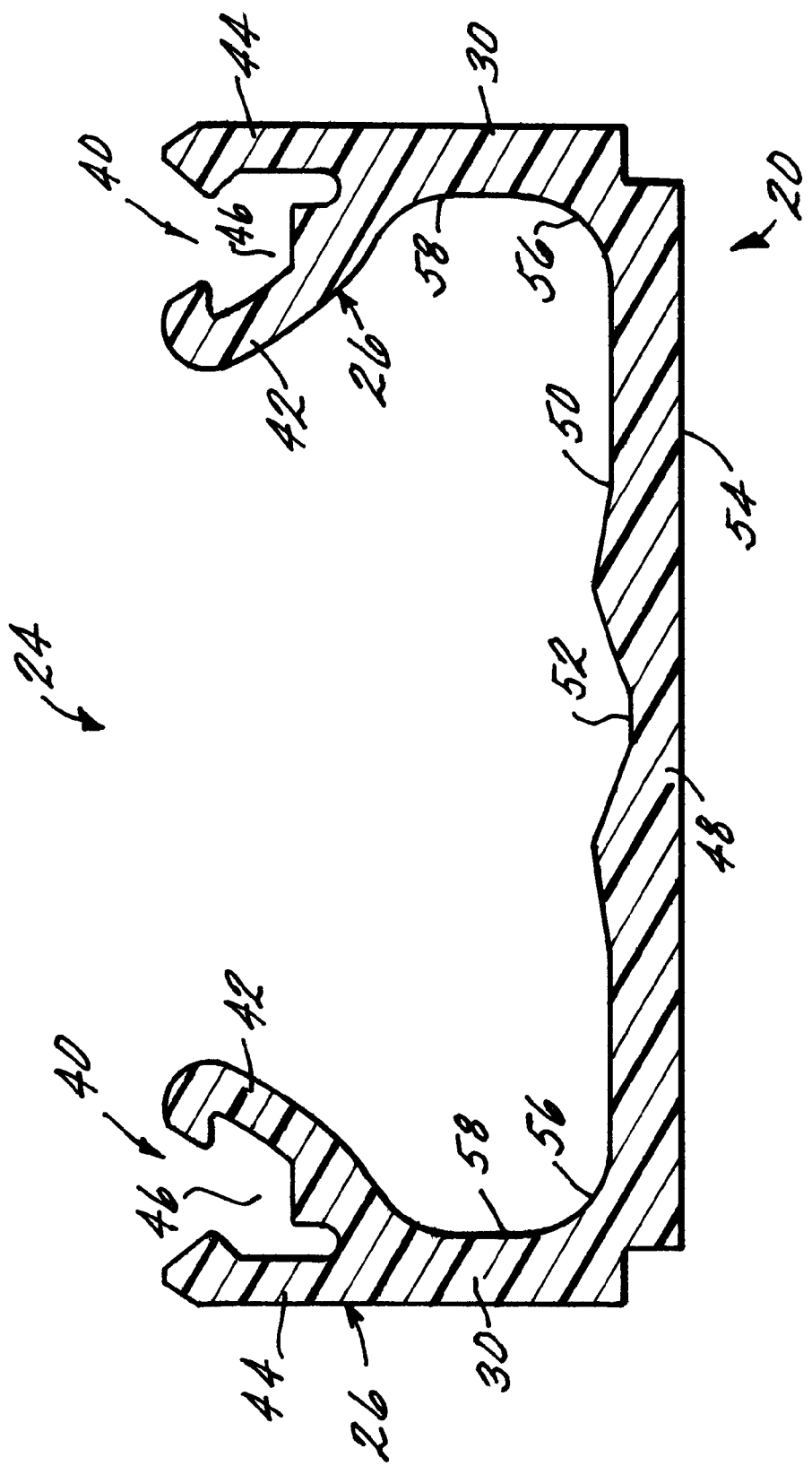
FIG. 2 is a transverse cross-sectional view of the base of FIG. 1.

Turing now to FIG. 2, base 20 includes a bottom wall 48 and opposing sides 30 to form a U shaped channel 24 along its longitudinal axis. Base 20 is preferably comprised of a resilient plastic material and other suitable materials may be employed, e.g. metal. Bottom wall 48 includes a top surface 50 with a recess 52 for receiving a fastener (not shown), such as a sheet rock screw, and a bottom surface 54 (which rests against the wall or other surface upon which the device is attached). In a preferred embodiment, arcuate surfaces 56 are provided between the junction of top surface 50 of bottom wall 48 and inner surfaces 58 of sides 30 to provide additional strength to the junction of bottom wall 48 and sides 30. Sides 30 include first hinge portions 26 having two extensions which depend upwardly in the form arms 42 and posts 44. Arms 42 extend upwardly from ends 30 and away from posts 44 generally toward the center of base 20 and to form openings 40 and retaining areas 46. Retaining areas 46 receive curved sections 36 of legs 34 through openings 40 by snap lock to allow cover 22 to be snapped closed onto base 20. Retainings areas 46 further retain curved sections 36 of legs 34 during their respective pivoted motion. It will be appreciated that curved sections 36 have a predetermined size greater than openings 40 between respective arms 42 and posts 44 and that at least one of the respective arms 42 and posts 44 flexes with respect to the other to removably receive respective curved section 36 through opening 40 and flexes back to retain the respective curved section 36 in respective retaining area 46.

Figure 5:
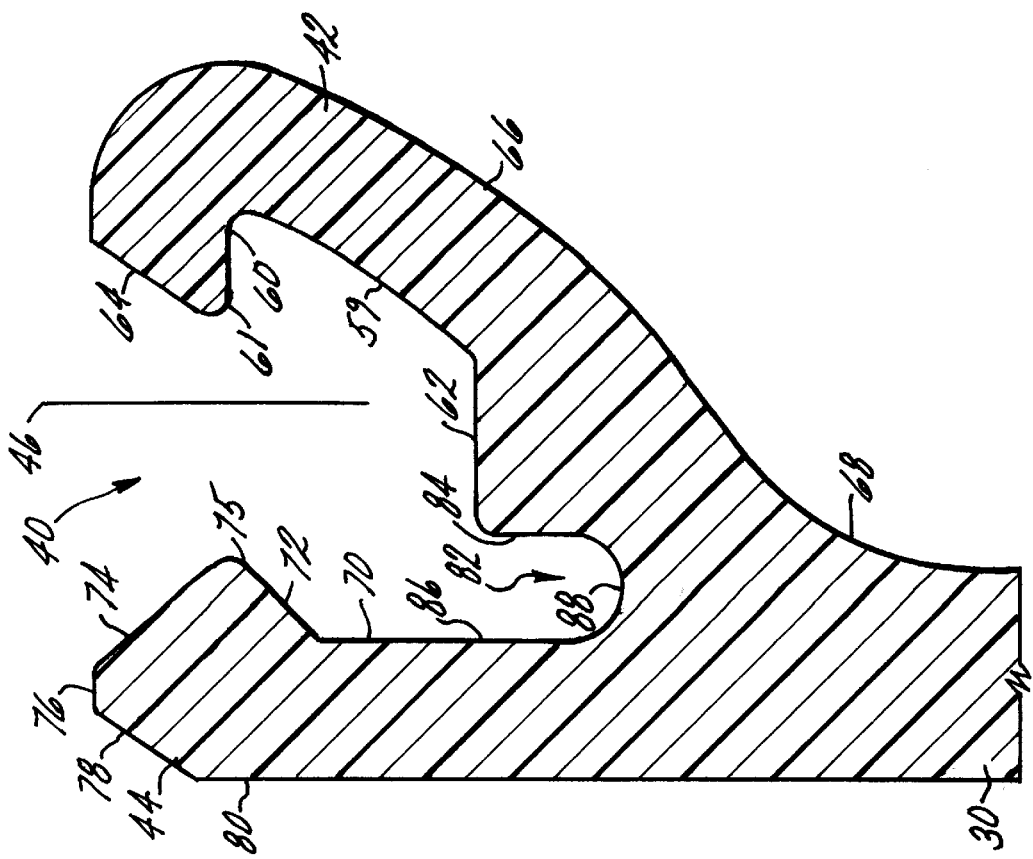
FIG. 5 is a transverse cross-sectional view of a left first hinge portion in accordance with the present invention.
Figure 8:
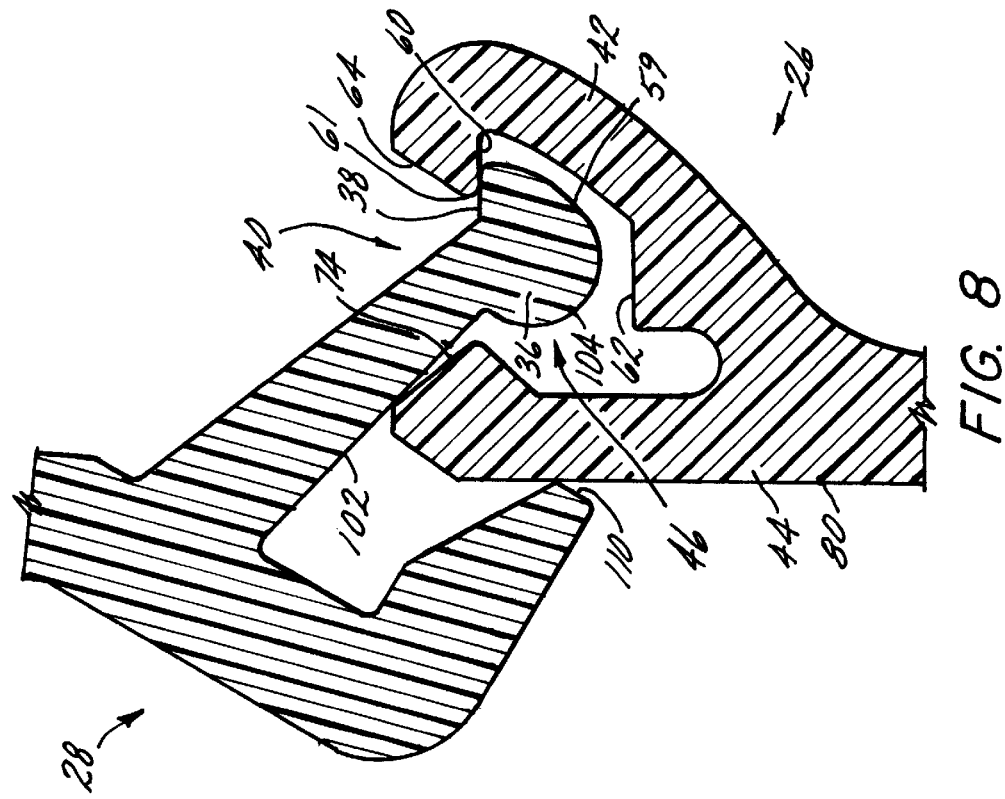
FIG. 8 is a transverse cross-sectional view of the left first and second hinge portions of FIGS. 5 and 6 in an open position.
Figure 9:
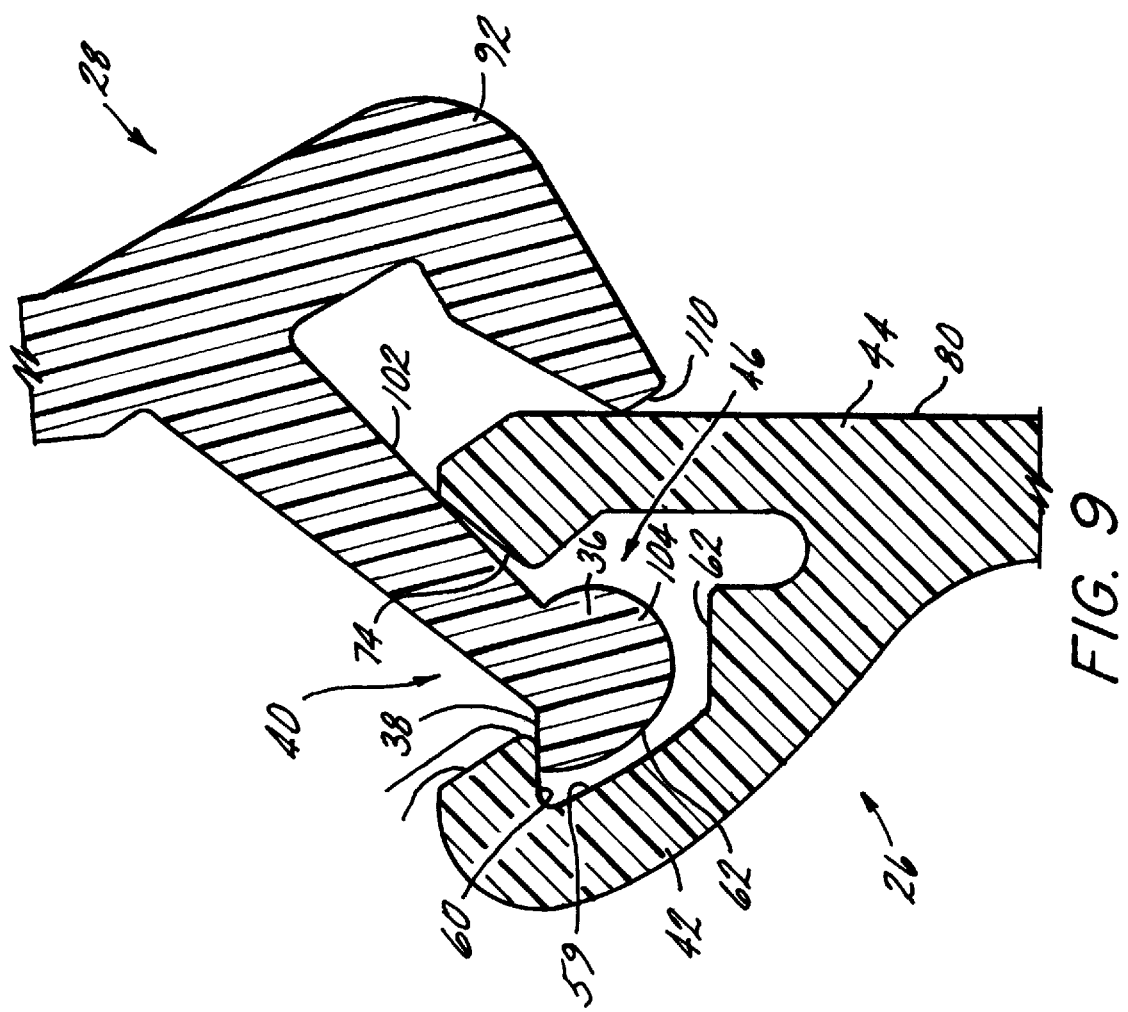
FIG. 9 is a transverse cross-sectional view of right first and second hinge portions in an open position in accordance with the present invention.

Referring now to FIG. 5, a discussion of the features of first hinge portions 26 follows. It should be noted that left first hinge portion 26 and right first hinge portion 26 are essentially a mirror image of each other as best seen in FIGS. 1, 2 and 4. First hinge portions 26 include arms 42 which extend upward and away from respective posts 44 generally toward the center of base 20 to form openings 40 which communicate with retaining areas 46 to receive curved sections 36 of legs 34 throughout their respective motion. Each arm 42 includes an inner arm surface 59, a hinge stop surface 60, an arm nub 61, a latch stop surface 62, an arm guide surface 64, an inner channel surface 66 and an arm arcuate surface 68. Each post 44 includes an inner post surface 70, a post latching surface 72, a post guide surface 74, a post nub 75, a cover pivot surface 76, a hinge open rest surface 78 and a post outer wall surface 80. In a preferred embodiment, strain reliefs 82 are formed at the junction of arms 42 and posts 44. Each strain relief 82 includes a first relief wall portion 84 of arm 42, a second relief wall portion 86 of post 44 and a relief semicircular portion 88 therebetween. Strain reliefs 82 allow sufficient flexure of arms 42 and posts 44 to removably receive curved sections 36 of legs 34 by snap fit through openings 40 and retain curved sections 36 in retaining areas 46. In the preferred embodiment, arm arcuate surfaces 68 provide additional strength to the junction of arms 42 and sides 30 to improve flexure of arms 42. As described in greater detail below, the geometry of the surfaces of arms 42 and posts 44 are configured to mate with curved sections 36 of legs 34 so that curved sections 36 are removably received by snap lock into openings 40 and retained in retaining areas 46 to allow cover 22 to be hinged open as best seen in FIGS. 1, 8, and 9. As also described in greater detail below, in a preferred embodiment, the geometry of the surfaces of arms 42 and posts 44 mate with planar sections 38 of curved sections 36 (distal ends) of legs 34 to provide a hinge stop at each respective cooperating first and second hinge portions as shown in FIGS. 1, 8, and 9. As best seen in FIG. 1, the hinge stop forms a trough 90 for loading and retaining cables during installation prior to snapping cover 22 into the closed position.

Figure 3:
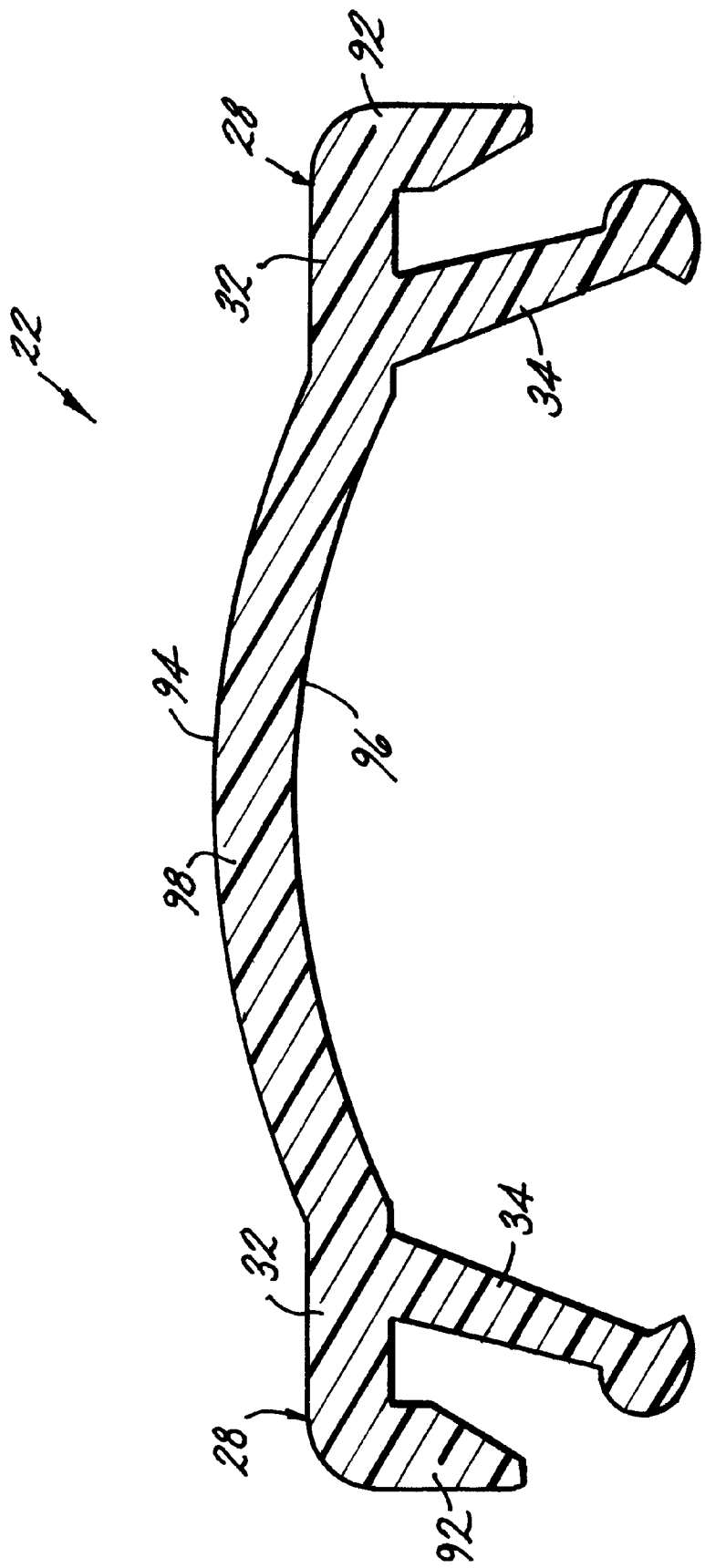
FIG. 3 is a transverse cross-sectional view of the cover of FIG. 1.

Referring now to FIG. 3, cover 22 includes second hinge portions 28. Each second hinge portion 28 has a projecting portion comprising leg 34 depending downward from a respective flat horizontal portion 32. In the preferred embodiment, legs 34 are angled away from the center of cover 20. Second hinge portions 28 further include outwardly and downwardly extending members in the form of fingers 92 which contact base 20 during rotation of second hinge portion 28 relative to first hinge portion 26 to provide a second hinge stop to limit the hinge action of the respective first and second hinge portions. Cover 20 includes outer surface 94 and internal surface 96. In the preferred embodiment, cover body 98 is slightly curved to provide an attractive appearance.

Figure 6:
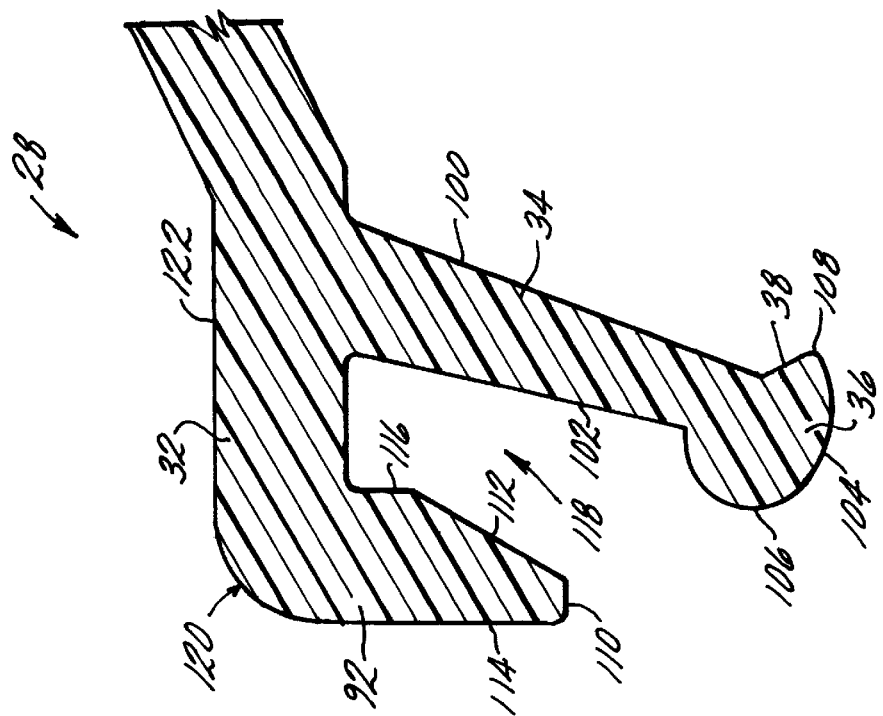
FIG. 6 is a transverse cross-sectional view of a left second hinge portion in accordance with the present invention.

Now referring to FIG. 6, a discussion of second hinge portion 28 follows. Right second hinge portion 28 is essentially a mirror image of left second hinge portion 28. Each leg 34 includes a leg inner surface 100, a leg outer surface 102, curved section 36, a curved surface 104, a latching surface 106, and planar section 38. Nub 108 on each curved section 36 is formed at the junction of curved surface 104 and planar section 38. Curved surface 104 extends from planar surface 38 along the bottom of curved section 36 until an approximate 8 o'clock position where it joins latching surface 106. Latching surface 106 is essentially a continuation of curved surface 104 and constitutes a contact region which makes contact with inner post surface 70 and post latching surface 72 when cover 22 is snapped onto base 20. It will be appreciated that the design of these surfaces may be varied to accomplish the snap lock action and hinge action, e.g., circular, elliptical, spherical, etc. Outwardly and downwardly extending members in the form of fingers 92 depend from flat horizontalportions 32 and each include a finger tip 110, finger surface 112, finger exterior surface 114, and finger vertical wall 116. Fingers 92 are placed exterior to legs 34 so that spaces 118 are formed therebetween. In a preferred embodiment, finger exterior surfaces 114 are curved 120 at the junction of finger exterior surfaces 114 and external surfaces 122 of horizontal portions 32 to make the raceway aesthetically pleasing.

Figure 7:
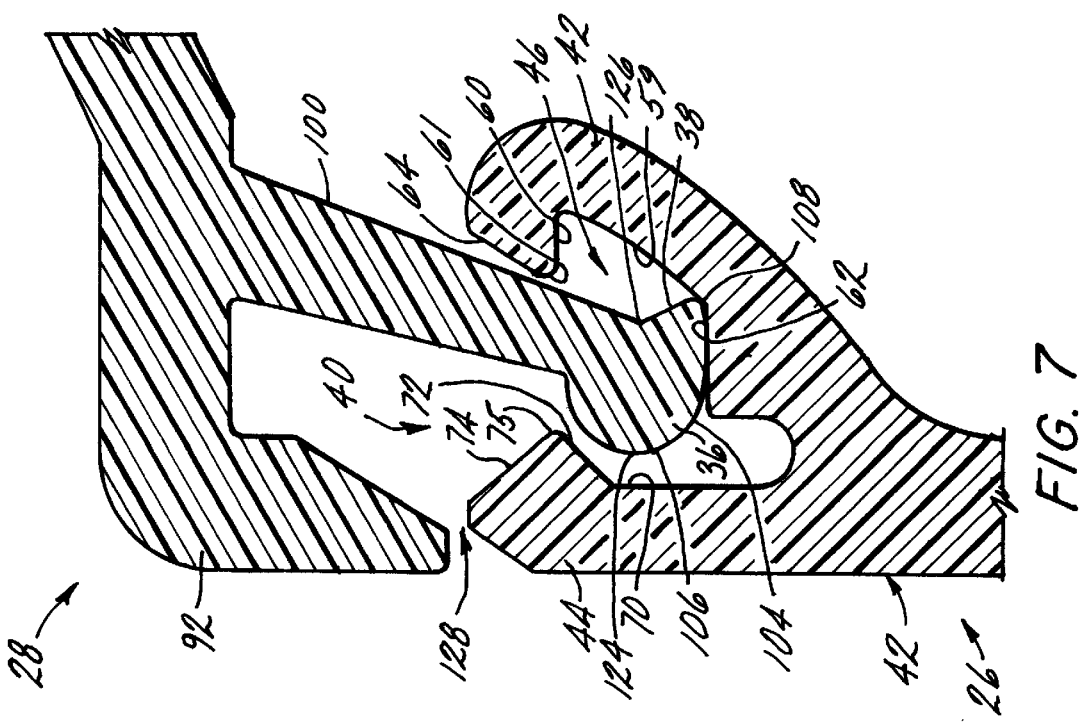
FIG. 7 is a transverse cross-sectional view of the left first and second hinge portions of FIGS. 5 and 6 in a closed position.

Turning now to FIG. 7, a discussion of first hinge portions 26 and second hinge portions 28 in the closed position follows. Arms 42 and posts 44 sufficiently flex to allow the distal ends (curved sections 36) to be removably inserted through openings 40 into retaining areas 46 by snap lock. Post guide surfaces 74 and arm guide surfaces 64 are angled to assist the insertion of curved portions 36. Curved surfaces 104 of curved sections 36 rest upon latch stop surfaces 62. Curved sections 36 are retained in retaining areas 46 by the contours of inner arm surfaces 59, hinge stop surfaces 60, arm nubs 61, latch stop surfaces 62, inner post surfaces 70, post latching surfaces 72, and post nubs 75. Referring now to one first and second hinge portion, side 124 of each curved section 36 is retained in retaining area 46 by the contact of latching surface 106 with inner post surface 70, post latching surface 72 and post nub 75. The other side 126 of each curved section 36 is retained by the contact of leg inner surface 100, planar section 38, and nub 108 with hinge stop surface 60 and inner arm surface 59. It will be appreciated that a variety of geometric configurations exist which would allow legs 34 to be removably inserted and hingedly connected to base 20. In the preferred embodiment, arms 42, posts 44, legs 34 and fingers 92 (including respective finger tips 110, finger surfaces 112, finger exterior surfaces 114, and finger vertical walls 116 (best seen in FIG. 6) are so dimensioned to reduce gaps 130 (best seen in FIG. 4) between respective fingers 92 and posts 44 on the base 20. Reducing gaps 130 provides a cleaner and more aesthetic appearance and reduces the potential to accumulate dirt and dust when the assembly is mounted in the horizontal direction.

Referring to FIG. 4, a further discussion of cover 22 and base 20 in the closed position follows. In the preferred embodiment base 20 and cover 22 have a symmetrical shape so that each arm 42 and post 44 sufficiently flex to allow curved sections 36 to be removably inserted through openings 40 into retaining areas 46 while allowing cover 22 to hinge open at either respective cooperating first and second hinge portions. Post guide surfaces 74 and arm guide surfaces 64 are angled to assist the insertion of curved portions 36. The curved surfaces 104 of curved sections 36 rest upon latch stop surfaces 62. Curved sections 36 are retained in retaining areas 46 by the contours of inner arm surfaces 59, hinge stop surfaces 60, arm nubs 61, latch stop surfaces 62, inner post surfaces 70, post latching surfaces 72, and post nubs 75.

Referring now to FIG. 8, a discussion of left first hinge portion 26 and left second hinge portion 28 hinged together follows. Semicircular surface 104 of curved section 36 is sufficiently curved and contacts latch stop surface 62 and inner arm surface 59 to allow curved section 36 to rotate with respect thereto until leg outer surface 102 contacts post guide surface 74 and finger tip 110 contacts post outer wall surface 80 to form trough 90 (shown in FIG. 1). During rotation planar section 38 is rotated until it contacts hinge stop surface 60 which prevents further rotation and retains curved section 36 in retaining area 46 in the open position. In a preferred embodiment, outwardly and downwardly extending member, finger 92, is attached to second hinge portion 28 and contacts post outer wall surface 80 to form a second hinge stop which cooperates with the first hinge stop.

Now turning to FIG. 9, a discussion of right first hinge portion 26 and right second hinge portion 28 hinged together follows. As when cover 22 is hinged at the left side, semicircular surface 104 of curved section 36 is sufficiently curved and contacts latch stop surface 62 and inner arm surface 59 to allow curved section 36 to rotate with respect thereto until leg outer surface 102 contacts post guide surface 74 and finger tip 110 contacts post outer wall surface 80. During rotation planar section 38 is rotated until it contacts hinge stop surface 60 which prevents further rotation and retains curved section 36 in retaining area 48 in the open position to form trough 90 (shown in FIG. 1). Outwardly and downwardly extending member, finger 92, is attached to second hinge portion 28 and contacts post outer wall surface 80 to form a second hinge stop which cooperates with the first hinge stop.

In light of the foregoing, it will be appreciated by those skilled in the art, the installer need not be concerned with the orientation of the base 20 during installation of the raceway as cover 22 is hingedly connected from either cooperating first and second hinge portions to form a trough 90 (shown in FIG. 1) to retain the cables during installation. The cover 22 may be easily snapped off either first hinge portion 26 of base 20 to gain access to the cables when desired. It should be noted that variations in the width and height of base 20 and cover 22 are contemplated with the scope of the present invention.

While the preferred embodiments have been shown and described, various modifications and substitutions may be made thereto without departing from the spirit and scope of the invention. Accordingly, it is to be understood that the present invention has been described by way of illustration and not limitation.

What is claimed is:

1. A raceway having a base and a cover receptive to cable comprising:

one of said base and said cover having spaced apart first hinge portions depending therefrom; and an other of said base and said cover having spaced apart second hinge portions depending therefrom, said first hinge portions cooperating with corresponding said second hinge portions to provide a rotation of one of said second hinge portions relative to a corresponding one of said first hinge portions at each cooperating first and second hinge portions, said first hinge portions further cooperating with said second hinge portions to provide a defeatable attachment at each cooperating said first and second hinge portions; wherein each of said first hinge portions includes opposed extensions depending therefrom, said extensions having a space therebetween to provide an opening; and each of said second hinge portions include a projecting portion having a distal end, said distal end being removably received between said extensions into said opening, said distal end and said projecting portion cooperating with said extensions to provide said rotation and said defeatable attachment at each cooperating said first and second hinge portions;

further comprising a strain relief between said extensions.

2. A raceway as claimed in claim 1, wherein:

said distal end has a dimension greater than said opening.

3. A raceway as claimed in claim 1, wherein:

one of said extensions is flexible with respect to the other to receive said distal end therebetween.

4. A raceway receptive to cable comprising:

a base having a first hinge portion depending therefrom, said first hinge portion including opposed extensions depending therefrom, said extensions having a space therebetween to provide an opening; and a cover having a second hinge portion depending therefrom, said second hinge portion including an extending projection and an extending finger, said projection being positioned between said extensions in said opening and said finger being positioned adjacent to one of said extensions and outside said opening;

said first hinge portion cooperating with said second hinge portion to provide a rotation of said second hinge portion relative to said first hinge portion, said first hinge portion cooperating with said second hinge portion to provide a defeatable attachment at said first and second hinge portions;

wherein said base includes two first hinge portions and said cover includes two said second hinge portions; and wherein each said finger is positioned outside of said base.

5. A raceway having a base and a cover receptive to cable comprising:

one of said base and said cover having a first hinge portion depending therefrom; and an other of said base and said cover having a second hinge portion depending therefrom, said first hinge portion cooperating with said second hinge portion to provide a rotation of said second hinge portion relative to said first hinge portion, said first hinge portion cooperating with said second hinge portion to provide a defeatable attachment at said first and second hinge portion; wherein said first hinge portion includes opposed extensions depending therefrom, said extensions having a space therebetween to provide an opening; and said second hinge portion includes a projecting portion having a distal end, said distal end being removably received between said extensions into said opening, said distal end and said projecting portion cooperating with said extensions to provide said rotation and said defeatable attachment at said first and second hinge portion;

further comprising a strain relief between said extensions.

* * * * *